Patented Mar. 9, 1937

2,072,955

UNITED STATES PATENT OFFICE 2,072,955

METHOD OF TREATING FOOD FOR HUMAN CONSUMPTION

William Richard Flodden Lunt, Durban, Natal, Union of South Africa

No Drawing. Application November 16, 1933, Serial No. 698,318. In Great Britain November 17, 1932

3 Claims. (Cl. 99—174)

This invention relates to a new or improved method of treating food for human consumption.

It is well known that papain (Papayotin) which is extracted from the leaves of the papaw tree (Carica papaya L.) is an active enzyme having properties similar to those of trypsin one of the pancreatic enzymes which is most active in the presence of alkalies and decomposes many albuminous bodies down to the stage of polypeptides.

The object of my invention is to permit this property of papain to be readily employed in ordinary domestic use for partially pre-digesting meat or other food and rendering it tender and easily assimilated.

According to my invention papain is prepared in the form of a solution in water and the solution is used in the preparation of foodstuffs or is absorbed by or incorporated with a suitable carrier which can be readily applied to meat or other food to be treated.

For example lint or similar absorbent fabric may be saturated with an aqueous solution of papain and then dried so that it can be readily packed for transport and sale or storage. The properties of the papain are not impaired by drying and when required for use the lint is simply moistened and wrapped round the meat or other food and left for a period of time depending on the amount of pre-digestion of the food required.

Meat so treated is made very tender and easily digested but is still thoroughly wholesome and appetizing.

In another method of carrying out my invention an aqueous solution of papain is incorporated with a base of gelatine to form a jelly which can be painted or brushed over the food to be treated.

For bread, biscuits, and like food the aqueous solution of papain is simply used as the whole or part of the liquid in the composition of the dough and the product has very valuable digestive properties.

The papain may be extracted from the leaves of the papaw tree in any convenient manner as for example by cutting up the green leaves and evaporating the milky juice which exudes from them. This method leaves the papain as a white powder which is readily soluble in water.

I claim:

1. An article for treating foodstuffs to render them tender and easily assimilable embodying a carrier impregnated with papain in soluble and releasable form, the carrier being readily applicable to the foodstuffs exteriorily in close contact therewith.

2. A new article of manufacture for treating foodstuffs to render them tender and easily assimilable, consisting of a dry sheet of neutral, absorbent material impregnated with papain which is readily releasable by moisture such sheet being readily applicable to the outer surface of the foodstuffs in close contact therewith as by wrapping.

3. A new article of manufacture for treating foodstuffs to render them tender and easily assimilable consisting a plastic neutral base carrying papain which is readily releasable by moisture such plastic base being readily applicable to the outer surface of the foodstuffs in close contact therewith, as by spreading.

WILLIAM RICHARD FLODDEN LUNT.